United States Patent [19]

Watkins

[11] Patent Number: 4,757,625

[45] Date of Patent: Jul. 19, 1988

[54] DISPLAY ARTICLE WITH RECHARGED PHOSPHORESCENT MEDIUM

[76] Inventor: Dana L. Watkins, 505 SE. Kouns, Topeka, Kans. 66607

[21] Appl. No.: 927,963

[22] Filed: Nov. 7, 1986

[51] Int. Cl.[4] .............................................. C09F 19/00

[52] U.S. Cl. ........................................ 40/406; 40/326; 40/543

[58] Field of Search ................. 40/406, 407, 326, 427, 40/439, 477, 543, 545

[56] References Cited

U.S. PATENT DOCUMENTS

| | | | |
|---|---|---|---|
| 3,058,245 | 10/1962 | Pieters | 40/406 |
| 3,225,470 | 12/1965 | Schwab et al. | 40/543 |
| 3,309,712 | 3/1967 | Cole | 40/544 |
| 3,464,132 | 9/1969 | Matisse | 40/407 |
| 3,691,983 | 9/1972 | Greenwood | 40/326 |
| 4,215,500 | 8/1980 | Sharp | 40/409 |

FOREIGN PATENT DOCUMENTS

| | | | |
|---|---|---|---|
| 1505785 | 3/1978 | United Kingdom | 40/406 |

*Primary Examiner*—Gene Mancene
*Assistant Examiner*—Wenceslao J. Contreras
*Attorney, Agent, or Firm*—Kokjer, Kircher, Bradley, Wharton, Bowman & Johnson

[57] ABSTRACT

An article for producing an interesting visual effect is disclosed. The article has a translucent or transparent conduit extending in a loop defining a path of fluid flow. A portion of the loop is contained in an opaque container and a portion extends out of the container. A pump moves a stream of liquid containing phosporescent particles through the conduit. A light in the container charges the particles immediately prior to their movement through the portion of the conduit outside the container where the glow from the moving particles are observable through the conduit wall. Continued operation continuously moves the particles past the light for recharging.

10 Claims, 1 Drawing Sheet

DISPLAY ARTICLE WITH RECHARGED PHOSPHORESCENT MEDIUM

This invention relates to lighting devices, and more particularly to articles which produce moving visual effects for aesthetic and advertising purposes.

Lighting devices for producing interesting and pleasing visual effects are generally well known. Lamps incorporating a variety of light dispersing, recirculating mediums for decorative effect are in widespread use. Devices of this type are also used as eye catching attractions for advertising displays. These devices typically involve a variety of apparatuses wherein air is bubbled through liquid or particles are suspended in a liquid to reflect light to the viewer. In some cases, two or more relatively immiscible liquids of different colors are moved through a transparent tube or other container in a manner wherein the shapes assumed by the moving liquid masses produce interesting visual demonstration.

Phosphorescence is luminescence that is caused by the absorption of radiations and which continues for a noticeable time after these radiations have stopped. Phosphorescent materials are commonly used to furnish visual identification in darkened environments. Thus, electric light switches are sometimes provided with patches or coatings of phosphorescent materials to mark the location of light switches in a darken room. The hands and numerals of watch and clock dials may incorporate phosphorescent coatings to be visible in the dark. The property for such materials to "glow in the dark" has long proved to be an interesting and useful phenomenon. Applicant has discovered that a display article which combines the feature of a moving visual presentation with the mystique involved in the phosphorescence phenomenon produces a surprisingly striking effect on the observer.

Phosphorescent materials have not heretofore been uses for display items of this general type probably because they require both a light source to charge the material and a darkened environment for viewing the glow which is produced. Accordingly, those devices of which applicant is aware have been limited to objects or fluids which are observable in direct or reflected light. This eliminates the possibility of using such devices in the dramatic setting of a substantially darkened environment, and deprives the observer of the aesthetic effect achievable from the phosphorescence phenomenon itself.

It is, therefore, a primary object of the present invention to provide a display article wherein a continuous flow of phosphorescent objects are presented to the viewer to produce a novel and pleasing aesthetic effect for the viewer.

Another important object of this invention is to provide such an article wherein the phosphorescent materials are charged by radiation immediately prior to movement into a viewing zone so that they display the maximum possible glow to the observer.

Still a further object of the invention is to provide the charging radiation from a light source that does not emit visible light from the device to distract from the visual effect produced by the phosphorescent phenomenon.

A yet further object of the instant invention is to provide a system wherein a plurality of phosphorescent objects may be recycled continuously between a zone of radiation to charge the materials and a zone where the glow from the materials may be used as a light source for aesthetic, advertising or illumination purposes.

These and other important aims and objectives of the present invention will be further explained or will become apparent from the following explanation and description of the drawing, wherein.

Figure 1:
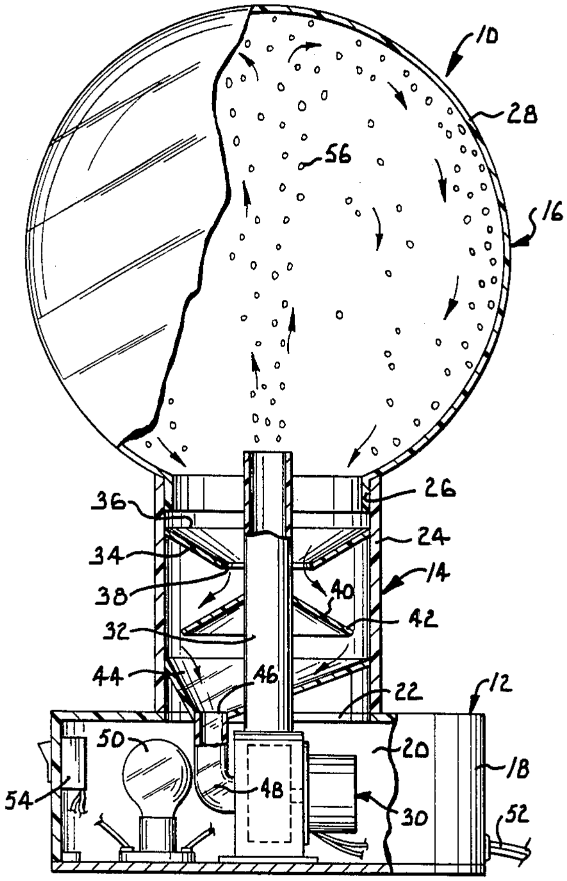
FIG. 1 is a front elevational view of one embodiment of a device incorporating the principles of this invention, parts being broken away and shown in cross-section to reveal details of construction.

Referring initially to FIG. 1 of the drawing, an article in the nature of a lamp embodying the principles of this invention is broadly designated by the reference numeral 10. Lamp 10 includes a base structure 12, an intermediate section 14 and a transparent or translucent display globe 16.

Base structure 12 comprises a plurality of opaque walls 18 arranged to define an interior cavity 20 having an opening 22 in the top of the structure communicating with the open bottom end of the opaque, tubular side wall 24 of intermediate section 14. The open upper end of wall 24 has telescoped therein a downwardly projecting integral collar 26 extending around an opening in the otherwise closed transparent or translucent wall 28 of globe 16.

An electrically operated fan 30 is mounted in cavity 20. The outlet of fan 30 communicates with an upright tube 32 opening into globe 16 as illustrated. A truncated conical deflector 34 is mounted in section 14 in disposition to span the distance across the latter with the outer rim 36 of the deflector engaged against the inner surface of wall 24 as illustrated in the drawing. Deflector 34 is inclined downwardly as the center of the deflector is approached and terminates in an annular opening 38 concentric with and spaced outwardly from the outer surface of the transversely circular tube 32.

Immediately beneath deflector 34 and spaced longitudinally along tube 32 from deflector 34 is a baffle 40. The latter is provided with a central opening through which tube 32 extends. The opening in baffle 40 is of a size that the baffle fits tightly around the tube. The baffle extends outwardly and downwardly from the tube as the outermost peripheral rim 42 of the baffle is approached. Rim 42 terminates in radially spaced relationship inwardly from the inner surface of wall 24 of section 14.

An upwardly and outwardly flared funnel 44 is positioned in section 14 beneath baffle 40 around tube 32 in disposition to catch material gravitating from the baffle. The bottom opening 46 of funnel 44 communicates with a conduit 48 connected with the inlet of fan 30. Funnel 44 and conduit 48 are constructed of transparent or translucent material.

A source of radiant energy in the nature of an incandescent electric light bulb 50 is mounted in cavity 20 immediately adjacent conduit 48 so that light emanating from bulb 50 will pass through the walls of the funnel and conduit. Electrical conductors 52 are adapted to be coupled with an electrical source and with the bulb and fan for energizing these items. A switch 54 mounted on structure 12 is operably coupled into the circuit for selectively energizing the bulb and fan as may be desired.

In operation, a plurality of phosphorescent particles 56 are installed in lamp 10. When fan 30 is not energized, the particles are free to gravitate to conduit 48. Particles 56 may be of any of a wide variety of phosphorescent materials, or may be flakes or small bits of non-phosphorescent materials which are coated with a phosphorescent substance. Particular materials suitable for carrying out the principles of this invention are numerous and well known to those skilled in the art. It suffices to say that the particles should be large enough to be readily visible to a viewer, yet should be sufficiently light in weight as to be readily entrained in an air stream generated by fan 30.

Energizing bulb 50 charges the phosphorescent particles by radiation emanating from the bulb and passing through the transparent or translucent conduit 48. Further, the energizing of fan 30 creates a flow of air upwardly through tube 32 carrying the charged particles along with this flow. The air discharging from the upper end of tube 30 into globe 16 swirls the charged particles throughout the globe for viewing the glow emanating from the particles through the transparent or translucent globe wall 28.

As illustrated in the drawing, the air stream carries the particles generally in a rising plume from the centrally located tube 32 toward the upper region of globe 16. The particles are deflected with the air stream by the inner surface of the globe wall 28 so that the particles tend to gravitate along the wall of the globe toward the bottom opening 26. The particles are deflected inwardly by deflector 34 and then outwardly by baffle 40 for subsequent reception by funnel 44 for return to the fan. The particles are recharged as they pass through the translucent or transparent funnel 44 and conduit 48 prior to return the fan and subsequently to the globe for viewing by the observer.

It will be readily apparent that lamp 10 provides an article wherein a plurality of phosphorescent particles are continuously moved by fan 30 along a path of travel extending through a zone where the particles are charged by the light radiating from bulb 50 to a zone where the glowing moving particles are observable through globe 16 by a viewer. Bulb 50 is obscured from the view of the observer by the opaque walls of base structure 12 and the opaque side wall of intermediate section 14. Further, the light radiating from lamp 50 is prevented from passing upwardly into globe 16 by deflector 34 and baffle 40 respectively. The deflector and baffle are constructed of opaque materials. They present a serpentine path through which the air and gravitating particles from the globe may move toward the collecting funnel, but through which the light from bulb 50 cannot pass. Thus, lamp 10 may be operated in a darkened environment wherein the maximum aesthetic effect from viewing the glowing phosphorescent particles 56 as they cascade through the globe can be achieved.

The number of particles incorporated in the system is, of course, not critical. Certainly, sufficient particles should be used to produce the particular visual effect desired. For some uses, this may be a relatively small number of particles providing a low particle density in the air stream. For other uses, a high particle density may be desirable.

Figure 2:
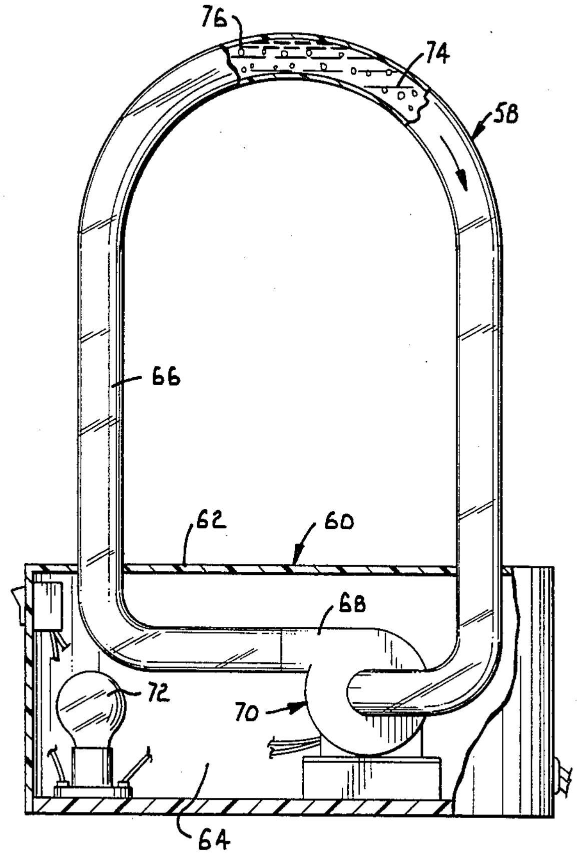
FIG. 2 is a view similar to FIG. 1 but illustrating an alternate embodiment.

The embodiment of the invention illustrated in FIG. 2 comprises an article broadly designated by the reference numeral 58 and includes a base structure 60 having opaque walls 62 defining an internal cavity 64. An elongated, transparent or translucent tubular conduit 66 extends in a closed loop from the outlet 68 of a pump 70 mounted in cavity 64 as illustrated. Conduit 66 extends first through a portion of cavity 64 and upwardly from structure 60 in a loop returning back into cavity 64 for connection with the inlet of pump 70. A source of radiation in the nature of an incandescent bulb 72 is mounted in cavity 64 immediately adjacent a stretch of conduit 66 as shown.

Conduit 66 contains a fluid medium in the nature of a transparent or translucent liquid 74 in which are entrained a plurality of phosphorescent particles 76. The particles 76 may be identical or similar to the particles 56 previously described. Obviously, particles 76 should be of a phosphorescent material or coated with a phosphorescent material, and the particles should not be soluble in the liquid.

In operation of article 58, pump 70 is operated to move the liquid in conduit 66 along a path of travel extending past light 72 and outwardly of structure 60 to a zone where the particles are observable through conduit 66 by a viewer. The phosphorescence of the particles is charged by the radiation from bulb 72 which passes through the conduit side wall before the particles are carried by the circulating liquid to the viewing zone outside of the base structure. Movement of the liquid and glowing particles through the viewing zone creates an interesting visual effect. After passing through the viewing zone, the particles are moved with the liquid through the pump and past bulb 72 where the particles are recharged. It will be readily apparent that article 58 also provides for the continuous recirculation of phosphorescent particles on a path of travel wherein the particles are first charged and then moved through a viewing zone where the glow from the particles can be seen by the viewer. Continuous circulation of the fluid by the pump continually carries the particles alternately from the charging zone to the viewing zone and back to the charging zone for further circulation.

Here again, the opaque walls of structure 60 restrict the charging light to the cavity and prevent its interference with the viewing of the movement of the glowing particles through the conduit in the visible zone. Article 58 can be operated in a dark room to maximize the aesthetic effect.

Figure 3:
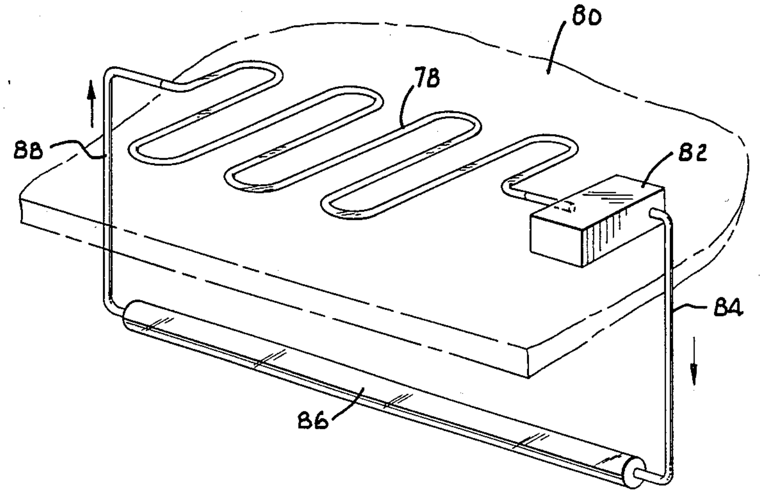
FIG. 3 is a perspective view on a reduced scale of still another embodiment of the invention, a structure such as a building roof being shown fragmentally in phantom.

FIG. 3 of the drawing illustrates a yet further embodiment wherein the general principles of this invention are utilized to provide artificial illumination to the interior of a building. A transparent or translucent conduit 78 extends in any desirable fashion in a region illuminated by sunlight. In the embodiment illustrated, conduit 78 is installed on the roof 80 of a building. The inlet of a pump 82 is connected to the conduit and the discharge side of the pump is connected through tube 84 to one end of an elongated tubular transparent or translucent member 86. The other end of member 86 communicates through a tube 88 with the input end of conduit 78.

In the operation of the system shown generally in FIG. 3, a plurality of phosphorescent particles are entrained in a liquid contained in the closed system defined by the respective components described above. Operation of pump 82 circulates the liquid through the system. The circulating liquid carries the particles first through the conduit 78 where the particles are charged by radiation given off by the sun. Member 86 is disposed in the interior of the building so that the energy absorbed by the phosphorescent particles is given off as the particles flow through member 86 to light the adjacent region. Obviously, the particles are recirculated continuously through the closed circuit for continuous illumination of the interior of the building.

It will be recognized by those skilled in the art that systems incorporating the principles of this invention may be used for a variety of purposes. For example, in addition to the illumination function, apparatus such as shown in FIG. 3 can be used to provide interesting and pleasing aesthetic effects. Further, member 86 might be employed as part of an advertising sign or as an eye catching display associated with an advertising sign. In similar manner, the forms of the invention illustrated in FIGS. 1 and 2 could also readily be utilized in connection with advertising signs, displays or the like.

Numerous variations in construction and operations will suggest themselves to those skilled in the art without departing from the principles of this invention. The forms of the invention illustrated and described should be considered as exemplary only, and it is not intended to limit the invention to these precise forms.

Having thus described the invention, I claim:

1. An article for producing a visual effect, said article comprising:

a plurality of phosphorescent particles in a fluid medium;

a source of radiation for charging the particles when the latter are exposed to the source;

means for circulating the medium with the particles entrained therein along a path of travel between a charging zone along said path where the particles are exposed to the source for charging the particles, and a viewing zone along said path where the glow emitted from the charged particles is visible to a viewer; and means for shielding the charging zone and the source of radiation from view by a viewer.

2. An article as set forth in claim 1, wherein the article incudes an elongated conduit defining said path of travel, and wherein the wall of said conduit is transparent at said charging and said viewing zones.

3. An article as set forth in claim 2, wherein said shielding means includes a structure having an opaque wall disposed along at least one side of said radiation source to shield the latter from the viewer, the transparent wall of said conduit extending in sufficiently close proximity to said source in said charging zone for charging said particles as the latter circulate with the medium on said path of travel.

4. An article as set forth in claim 3, wherein said structure includes an enclosure having a plurality of opaque walls defining an interior cavity, said conduit defining a loop extending through the cavity and exteriorally of the structure with the walls of the cavity partially enclosing the conduit.

5. An article as set forth in claim 4, wherein said radiation source is in said cavity.

6. An article as set forth in claim 5, wherein said radiation source is an incandescent electric light.

7. An article as set forth in claim 2, wherein said medium is air, and wherein said circulating means incudes an electric fan operably associated with the conduit for blowing the air along the path of travel and at a rate of speed sufficient for carrying said particles with the air.

8. An article as set forth in claim 2, wherein said medium is a translucent liquid, and wherein said circulating means includes a pump operably associated with the conduit for forcing said liquid and particles along said path of travel.

9. An article for producing a visual display, said article comprising:

a base structure having opaque walls defining a cavity therein hidden by the walls from view;

a light passing conduit defining an elongated passage, the conduit extending through the cavity and outwardly from the structure;

a translucent fluid medium in the conduit;

a plurality of phosphorescent particles in the fluid medium;

an incandescent lamp in the hidden cavity in disposition to emit light through the conduit in the cavity; and means for moving the fluid through the passage at a speed to entrain the particles in the fluid for movement therewith, whereby the particles are charged by the lamp during movement through the cavity and while the lamp and the light emanating therefrom are hidden from view in the structure, the glow emanating from the charged phosphorescent particles being visible as they are carried by the conduit outwardly of the structure.

10. An article as set forth in claim 9, wherein said conduit extends in a loop through the cavity and outside the structure, said moving means continuously circulating the medium through the loop whereby the particles are continuously alternately moved on a path of travel through a charging zone in the cavity past the lamp for charging the particles then through a zone outside the structure wherein the light from the glowing charged particles is visible to a viewer.

* * * * *